Feb. 8, 1949. P. ROSENBERG 2,461,181
REFLECTING DEVICE
Filed Aug. 8, 1945
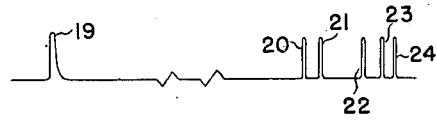
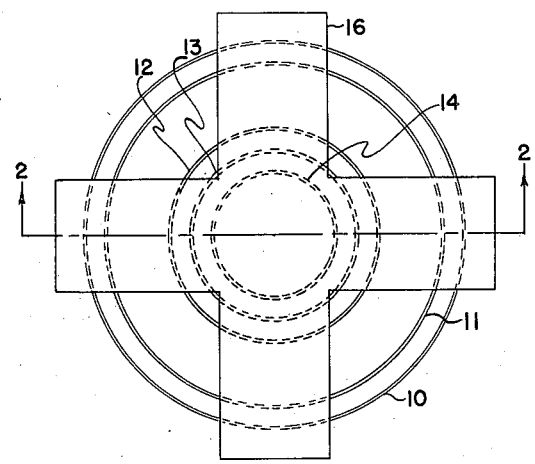
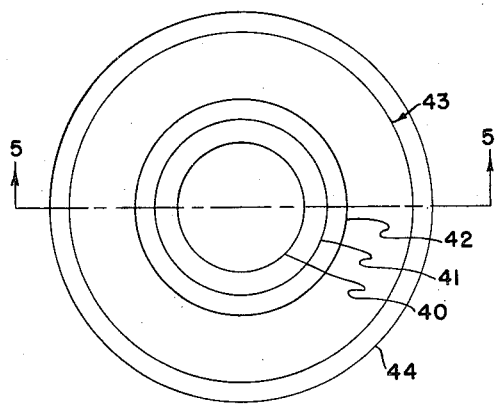
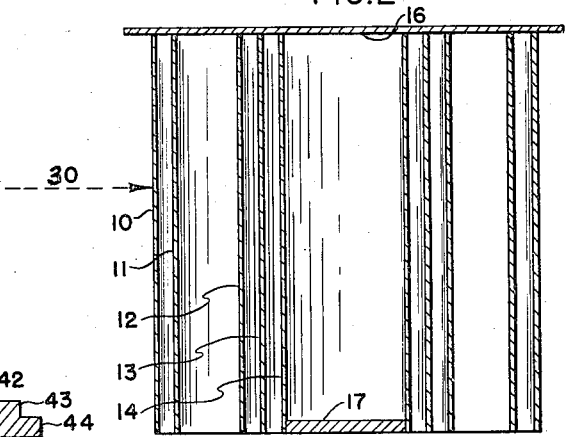
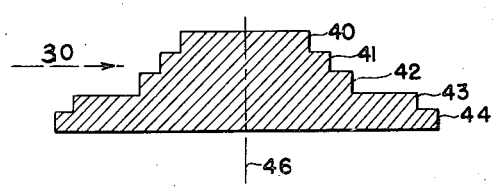
INVENTOR.
PAUL ROSENBERG
BY
ATTORNEY

UNITED STATES PATENT OFFICE 2,461,181

REFLECTING DEVICE

Paul Rosenberg, Brookline, Mass., assignor, by mesne assignments, to the United States of America as represented by the Secretary of War Application August 8, 1945, Serial No. 609,659

16 Claims. (Cl. 177—386)

This invention relates to reflecting devices and more particularly to devices designed to reflect supersonic waves in a liquid medium.

Systems have been developed to simulate the operation of radio object-locating systems by means of supersonic waves transmitted through a liquid medium. In radio object-locating systems circuits or devices known as beacons are used to transmit a predetermined signal in response to a received radio-frequency pulse.

The signal transmitted by the beacon in response to the received pulse is usually a series of radio-frequency pulses with a varying time interval between pulses, the number of pulses and time intervals between pulses being so arranged as to form a coded reply that may be used to identify the beacon.

It would be possible to build a supersonic transmitter or beacon circuit that would transmit any desired pulse-coded reply and thus simulate exactly the operation of the electronic beacon. Such a system would require the duplication of the circuits present in the electronic beacon and hence would require a large amount of equipment and would also present many difficulties in the design of the transmitter and receiver so as not to interfere with the other functions of the supersonic system in simulating the operation of the radio object-locating system.

It is an object of the present invention, therefore, to present a simple, novel device for simulating in a supersonic system the signals received from an electronic beacon without the necessity of reproducing the circuits of the electronic beacon.

In accordance with the present invention there is provided a plurality of coaxially mounted cylinders so designed that a multiple reflection occurs when a supersonic pulse impinges on said cylinders.

For a better understanding of the invention, together with other and further objects thereof, reference is had to the following description taken in connection with the accompanying drawings in which:

Fig. 1 is the plan view of one reflecting device used to simulate an electronic beacon;

Fig. 2 is a sectional elevation of the device shown in Fig. 1 taken along the line 2—2 of Fig. 1;

Fig. 3 is an echo pattern produced by the device shown in Figs. 1 and 2;

Fig. 4 is the plan view of a second reflecting device; and

Fig. 5 is a sectional elevation of the device shown in Fig. 4 taken along the line 5—5.

Referring now to Figs. 1 and 2, there are shown five hollow circular cylinders 10, 11, 12, 13 and 14. Cylinders 10 to 14 are constructed of sheet metal or other like material. The diameter of each of the cylinders may be made slightly smaller at the top than at the bottom to prevent multiple reflections from occurring within the cylinders. The reason why this multiple reflection is particularly undesirable will become apparent shortly. Cylinders 10 to 14 are supported by a cross-shaped support 16, support 16 being made of metal or similar rigid material. Cylinders 10 to 14 are attached to support 16 by welding, soldering, cementing or by any other convenient fastening means that will not be affected by moisture. Cylinder 14 is preferably completely sealed against the entrance of moisture where it makes contact with support 16. Cylinder 14 is sealed at the lower end by disk 17. Again disk 17 may be any material that is substantially unaffected by prolonged immersion in water. The surfaces of cylinders 10 to 14 are highly polished to provide a good reflecting surface.

The reflector shown in Figs. 1 and 2 is employed in the following manner. When the object-locating device associated with this reflector is switched to beacon operation, this reflecting device is lowered into the liquid medium either manually or automatically as the particular situation may dictate. The axis of the cylinders is accurately placed over the point on the map at which the simulated beacon is supposed to be located. When a pulse of supersonic energy from the supersonic transmitter travelling along path 30 strikes cylinders 10 to 14, a partial reflection of the supersonic energy will occur at each cylinder. If path 30 is normal to the point of contact with each of the cylinders, these partial echoes will be returned along path 30 to the supersonic receiver. The space within cylinder 14 does not contain any liquid so consequently no appreciable supersonic energy is transmitted through this space. Any multiple reflections that occur within the cylinders or between the cylinders will be directed away from the supersonic receiver due to the slight tapering of the cylinders.

Fig. 3 shows the reflection pattern from the reflector shown in Figs. 1 and 2 as this pattern might appear on the indicator of the supersonic receiver. The transmitted pulse is represented by pulse 19 while pulses 20, 21, 22, 23 and 24 represent the echoes from cylinders 10, 11, 12, 13 and 14, respectively. It can be seen that this echo pattern is very similar to the response from radar beacons. It should be noted, however, that while in radar beacons the distance between pulses 19 and 20 is proportional to the distance between the radar transmitted and the radar beacon, in Fig. 3 the distance between pulse 19 and pulse 20 is proportional to the distance from the supersonic transmitter to the outer cylinder 10. To overcome this difference, all echoes received by the supersonic system while in beacon operation are delayed by a time equal to the time of travel of a supersonic pulse for a distance equal to one diameter of cylinder 10. If all reflectors are made with a standard outer diameter, one delay line in the supersonic receiver will serve for all reflectors. The pulse code of the various reflectors may be changed by changing the number and size of the cylinders included within the outer cylinder.

While the physical size of the reflector shown in Figs. 1 and 2 is of sufficient size to cast an appreciable shadow and should, therefore, be removed when simulating radar operation with the supersonic system, this physical size does not affect the azimuth definition or angle through which an echo signal will be returned to the supersonic receiver. This can be seen from the fact that while pulses from the transmitter will strike the reflector as the transmitter is moved through a relatively large angle, only those pulses striking normal to the outer surface of cylinder 10 will be returned along the same path to the receiver. All other pulses will be directed away from the receiver.

Referring now to Figs. 4 and 5, there is shown a second device for producing the reflection pattern shown in Fig. 3. It can be seen from Figs. 4 and 5 that this device consists of five solid cylinders 40, 41, 42, 43 and 44 having a common axis 46. A reflection of the supersonic pulse occurs at the wall of each cylinder. Since the cylinders vary in diameter, the time that the reflections will occur will also vary. Any desired code may be simulated by properly choosing the number and sizes of the cylinders. The complete reflector unit may be made up of individual disks, or the whole unit may be made in one piece as shown in Fig. 5. In either case the surface from which the reflection occurs should be smooth and free from any holes or scratches if the best results are to be obtained with this reflector. The reflector shown in Figs. 4 and 5 is used in exactly the same manner that the reflector shown in Figs. 1 and 2 is used.

The advantages of this invention are thought to be obvious. The operation of a relatively complicated electronic beacon is simulated in a supersonic system by a simple reflector. This, of course, eliminates all power supplies, electronic circuits, and so forth that would ordinarily have to be employed to simulate the electronic beacon. Further, when beacon operation is no longer desired, the whole reflector may be removed from the path of the supersonic beam, thus eliminating the possibility of shadow such as might be caused by a crystal or other radiating device that would have to be used if the beacon operation was to be simulated by electronic circuits. The code and position of this reflector can be changed in much less time and with much less work than would be required with other types of supersonic beacons.

While there has been described what is at present considered the preferred embodiment of the invention, it will be obvious to those skilled in the art that various changes and modifications may be made therein without departing from the invention.

What is claimed is:

1. A supersonic reflector comprising a plurality of hollow cylindrical elements of graduated sizes, means for maintaining said cylindrical elements in a substantially coaxial arrangement whereby a coded echo is produced when a pulse of supersonic energy impinges on said reflector, and means for suppressing undesirable echoes from said reflector.

2. A supersonic reflector comprising a plurality of solid cylindrical elements of graduated sizes, and means for holding said cylindrical elements in a linear coaxial array whereby a predetermined coded echo is produced when a pulse of supersonic energy impinges on said reflector.

3. A supersonic reflector comprising a plurality of cylindrical elements of various diameters, and means for maintaining said cylindrical elements in such a position that a predetermined coded echo is produced when a pulse of supersonic energy impinges on said reflector.

4. A supersonic reflector comprising a plurality of nested cylindrical elements, and means for maintaining said cylindrical elements in substantially coaxial alignment whereby a predetermined coded echo is produced when a pulse of supersonic energy impinges on said reflector.

5. The device according to claim 4 wherein said cylindrical elements are laterally spaced whereby a plurality of discrete echoes may be obtained when a pulse of supersonic energy impinges on said reflector.

6. The device according to claim 4 wherein the innermost of said cylinders encloses a medium having a reflective coefficient that is different than that of the medium surrounding the remaining cylinders.

7. A supersonic reflector to produce a coded signal comprising a plurality of spaced, substantially parallel surfaces, means to maintain said surfaces in such a position that a predetermined coded echo is produced when a pulse of supersonic energy impinges on said reflector, said surfaces being formed of a material that will partially reflect and partially transmit a supersonic wave incident thereon whereby a plurality of reflections will be obtained, the time intervals between said reflections being a function of the distances between said surfaces.

8. A device according to claim 7 and means whereby that portion of incident energy that is transmitted through said reflector and incident on that surface most remote from the source of said supersonic wave will be totally reflected.

9. The device according to claim 7, wherein the extremities of said surfaces are in register.

10. The device according to claim 7, wherein said surfaces are arranged in a staggered relationship.

11. A device according to claim 7 and means to suppress undesirable reflections from said reflector.

12. A device according to claim 7 wherein said surfaces are interconnected by a medium having a first transmission characteristic that is identical to that of the environment of said reflector, and wherein the outer face of either of the end surfaces of said plurality of surfaces is bounded by a medium having a second transmission characteristic of a value that is different than the value of said first transmission characteristic.

13. A supersonic reflector to produce a coded signal comprising a plurality of spaced substantially parallel surfaces, means to maintain said surfaces in such a position that a predetermined coded echo is produced when a pulse of supersonic energy impinges on said reflector, said surfaces being formed of a material that will partially reflect and partially transmit a supersonic wave incident thereon whereby a plurality of reflections will be produced, the time intervals between said reflections being a function of the distances between said surfaces, said surfaces being interconnected by a medium having a transmission characteristic that is identical to that of the environment of said reflection and wherein the outer face of either of the end surfaces is bounded by a medium having a second transmission characteristic having a value other than that of the first medium, and means to suppress undesirable reflections from said reflector.

14. The device according to claim 13, wherein the extremities of said surfaces are in register.

15. The device according to claim 13, wherein said surfaces are arranged in a staggered relationship.

16. A device according to claim 13, wherein said surfaces comprise a plurality of concentric nested cylinders, the innermost of said cylinders being closed at both ends and containing the medium having the above named second transmission characteristic.

PAUL ROSENBERG.

REFERENCES CITED

The following references are of record in the file of this patent:

UNITED STATES PATENTS

| Number | Name | Date |
| --- | --- | --- |
| 1,384,014 | Fessenden | July 5, 1921 |
| 1,610,779 | Hewett | Dec. 14, 1926 |
| 2,212,110 | Beuermann | Aug. 20, 1940 |
| 2,249,835 | Lakatos | July 22, 1941 |

OTHER REFERENCES

Ser. No. 382,084, Menges (A. P. C.), published May 18, 1943.